United States Patent [19]
Heo

[11] Patent Number: 5,971,114
[45] Date of Patent: Oct. 26, 1999

[54] BRAKE PEDAL LOCKING APPARATUS

[75] Inventor: Cheol Heo, Woolsan, Rep. of Korea

[73] Assignee: Hyundai Motor Company, Rep. of Korea

[21] Appl. No.: 08/932,696

[22] Filed: Sep. 18, 1997

[30] Foreign Application Priority Data

Sep. 18, 1996 [KR] Rep. of Korea ....................... 96-40536
Sep. 18, 1996 [KR] Rep. of Korea ....................... 96-40552

[51] Int. Cl.⁶ .................................................. F16D 69/00
[52] U.S. Cl. ................................ 188/265; 74/512; 74/560
[58] Field of Search ............................. 188/112 R, 265, 188/352, 353; 74/512, 526, 560, 562, 562.5, 563, 544, 564; 70/202, 237, 254

[56] References Cited

U.S. PATENT DOCUMENTS 4,942,949  7/1990  Dai .......................................... 188/265
5,842,364  12/1998  Oliver ..................................... 188/265

*Primary Examiner*—Robert J. Oberleitner
*Assistant Examiner*—Mariano Sy
*Attorney, Agent, or Firm*—Christie, Parker & Hale, LLP

[57] ABSTRACT

A brake pedal locking apparatus, the apparatus comprising a latching groove formed at a surface of a brake pedal; a hook device having a hook head for inserting into the latching groove to fix a brake pedal in its pushed position; a housing having a hook device receiving cavity therein and a penetrated hole for a hook device to protrude therethrough; a compression spring for pushing the hook device to protrude out of the penetrated hole; and an operational lever connected to the hook device by a wire for pulling the hook device into the housing.

10 Claims, 2 Drawing Sheets

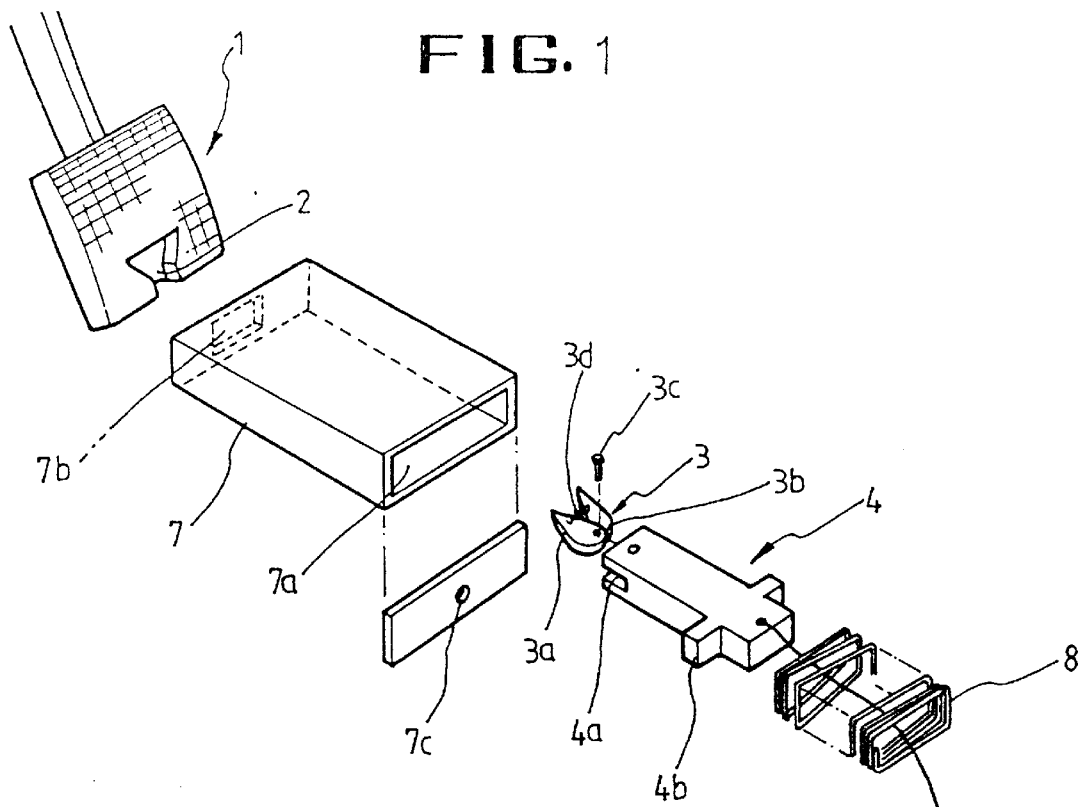
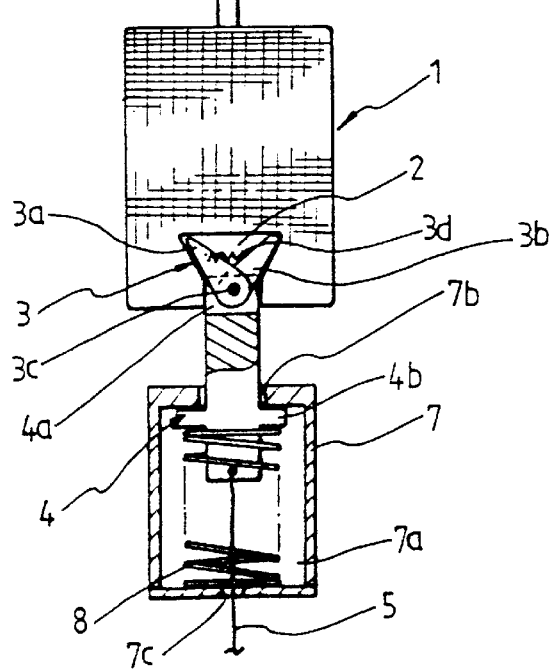

BRAKE PEDAL LOCKING APPARATUS

FIELD OF THE INVENTION

This invention relates to a brake pedal, and more particularly to a brake pedal locking apparatus for maintaining a brake pedal at a pushed condition by manipulating a lever.

DESCRIPTION OF THE PRIOR ART

A car brake system is an apparatus for reducing the speed of a car or for stopping and parking the car. Generally a friction-type brake is used as the brake system, which brakes a car by changing momentum energy of a car to heat energy through friction.

A brake pedal is a device for transmitting an operational force of a driver to a brake system. The pedal is fixed integrally around a rotational shaft supported by a pedal supporter and returns to its unpushed position by a return spring when a driver releases the pedal.

Accordingly, when a driver kicks a brake pedal, the pushing force is transmitted to brake pads or linings through a master cylinder to brake a car. When a driver releases the pedal, the pedal returns to its unpushed position by the return spring to unbrake the car.

Therefore, when the driver leaves a car temporally, he should lift a parking lever because the pedal returns automatically to its unpushed position by the return spring to unbrake the car. Further, the driver continues to push the pedal on the road during a traffic jam which may cause driver's fatigue.

Accordingly, it is an object of the present invention to provide a brake pedal locking apparatus for maintaining a brake pedal in a pushed condition by manipulating a lever for enhancing convenience of pedal operation when a driver temporarily leaves the driver's seat to do something and reducing driving fatigue during a traffic jam.

SUMMARY OF THE INVENTION

The above and other objects are achieved according to the invention of a brake pedal locking apparatus including a latching groove formed at an upper surface of a brake pedal, a hook device having hook heads for inserting into the latching groove to fix a brake pedal in its pushed position. The apparatus also includes a housing fixed to the floor of a car and adjacent to the brake pedal having a hook device receiving cavity therein and a penetrated hole for the hook device to be protruded therethrough; a compression spring for pushing the hook device to be protruded out of the penetrated hole to be inserted into latching groove to keep the brake in its pushed position; and an operational lever connected to the hook device by a wire for pulling back the hook device into the housing and thus releasing the brake from its pushed position.

The invention also provides a brake pedal locking apparatus fixed to the floor of a car, the apparatus comprising: a latching groove formed at an upper surface of a brake pedal; a moving latching member separatively insertable into the latching groove to fix the brake pedal; a shifting means for shifting the latching member to be inserted into the latching groove; a return means for separating the latching means from the latching groove with the restoring force; and a guide means for guiding the latching means to be inserted into or separated from the latching groove.

BRIEF DESCRIPTION OF THE DRAWINGS

For fuller understanding of the nature and objects of the invention, reference should be made to the following detailed description taken in conjunction with the accompanying drawings in which:

FIG. 1 is a disassembled perspective view of a brake pedal locking apparatus according to a first embodiment of the present invention;

FIG. 2 is a cross-sectional view of a brake pedal locking apparatus of FIG. 1 in a locked condition;

DESCRIPTION OF THE PREFERRED EMBODIMENTS

Figure 3:
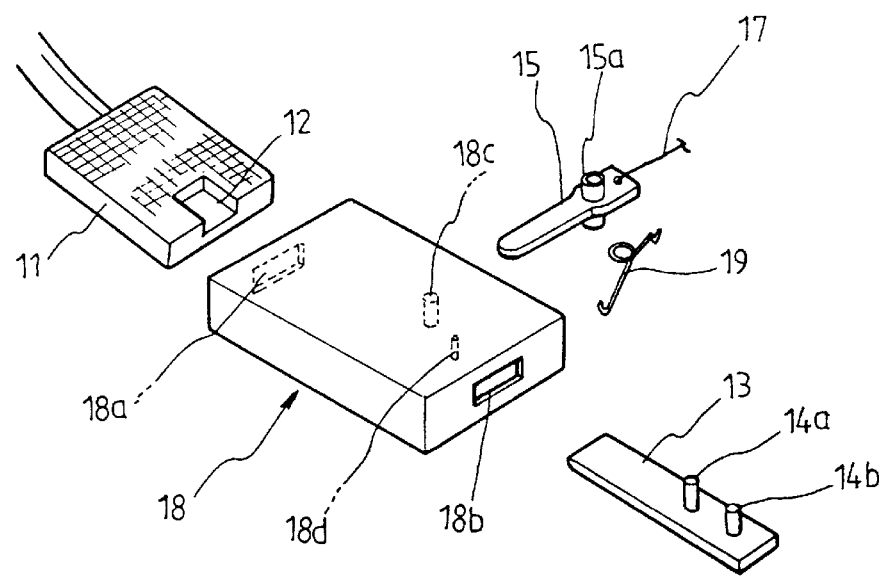
FIG. 3 is a disassembled perspective view of a brake pedal locking apparatus according to a second embodiment of the present invention.

The preferred embodiments of the present invention will now be described in detail with reference to the accompanying drawings.

FIG. 1 is a disassembled perspective view of a brake pedal locking apparatus according to a first embodiment of the present invention and FIG. 2 is a cross-sectional view of the brake pedal locking apparatus in a locked condition. The brake pedal locking apparatus is fixed securely on the floor of a car adjacent to a brake pedal 1. The brake pedal 1 is fixed integrally around a rotational shaft supported by a pedal supporter and connected to a return spring (not shown) and has a latching groove 2 on its upper surface. The brake pedal locking apparatus includes a hook head 3 is inserted separably into the latching groove 2 and moves back and forth along the latching groove 2 for fixing the pedal 1 in its pushed position therein by overcoming the resiliently restoring force of the return spring of the pedal 1.

The hook head 3 includes two hook members 3a and 3b rotatively connected on a hinge pin 3c and a compression spring 3d installed between the hook members 3a and 3b to provide the same with spreading force.

The latching groove 2 is funnel-shaped so that the hook head 3 could not be easily detached from the latching groove 2 in an outward direction. But, the engaging and latching action of the hook head 3 to the groove 2 could be accomplished easily because the compression spring 3d keeps the hook members 3a and 3b close together, thus, the hook head 3 can easily be inserted to the groove 2. The housing 7, the hook device 4, and the hook head 3 are positioned in a substantially same plane as the brake pedal 1 when the brake pedal 1 is in a pushed position so that the hook members 3a and 3b can easily be inserted to the groove 2 by the force of a compression spring 8 as shown in FIG. 2. When the brake pedal 1 is not in a pushed position, it is positioned farther away from and relatively above the brake locking apparatus. The engaging and latching of the hook head 3 to the groove 2 is accomplished by opening of the hook member 3a and 3b due to resilient force of the compression spring 8 pushing the hook head 3 against the pedal 1 when the pedal is in its pushed position.

The hook head 3 is inserted into a hole 4a formed on the front end of the hook device 4 and mounted by a pin. Two latching projections 4b is formed protrudingly and vertically opposing each other at the rear part of the hook device 4. One end of a wire 5 is connected to the rear end of the hook 4 and the other end of the wire 5 is connected to an operational lever located near a driver.

The hook device 4 is received in a box-shaped cavity 7a of a housing 7. A penetrated hole 7b is formed at the front part of the housing 7 communicating with the cavity 7a so that the hook device 4 is inserted therein and is able to move back and forth along the hole 7b. A wire hole 7c is formed at the rear surface of the housing 7, through which a wire 5 connected to the hook device 4 can be extended outside the housing 7. Further, the hook device 4 received in the housing 7 is pushed forward by the compression spring 8 supported with the latching projections 4b. The housing 7 is fixed securely to the floor of the car adjacent to the brake pedal 1. A variety of fixing means (not shown) such as screws, bolts, pins, welding, etc., may be used to secure the housing 7 to the floor of the car.

Accordingly, when a driver is ready to get out of a car and wants to fix the brake in its pushed position, the driver pushes the pedal 1 and rotates the operational lever 6. The operational lever 6 makes the wire 5 loose so that the hook device 4 is pushed forward by a resiliently restoring force of the compression spring 8. Then, the hook device 4 is inserted into the penetrated hole 7b of the housing 7 and the hook head 3 protrudes out of the housing to be inserted and latched into the latching groove 2 of the pedal 1.

Further, the hook member 3a and 3b of the hook head 3 are forced apart by the spring 3d to be latched in the latching groove 2, so that the brake pedal 1 maintains its pushed condition by the hook head 3 and hook device 4. As a result, the brake remains operational and the car remains in a braking condition.

According to the present invention, unless a driver pushes a brake pedal, the hook device maintains the pedal in the pushed position, so that a driver could leave the car to do other things. Further, the hook device would help reduce the fatigue of a driver in a traffic jam.

When a driver wants to release the pedal from the braked condition, he should rotate the rotational lever reversely. Then, the operational lever 6 pulls the wire 5, the wire 5 pulls the hook device 4 at the same time and the hook device 4 is pulled back and received in the housing 7. The hook members 3a and 3b are pushed toward each other by the latching groove and the hook head 3 gets out of the latching groove 2 of the brake pedal 1 to be received in the penetrated hole 7b as collapsed. The brake pedal is relieved from the hook head 3 and hook device 4 and returns to an unpushed position by its return spring.

Figure 4:
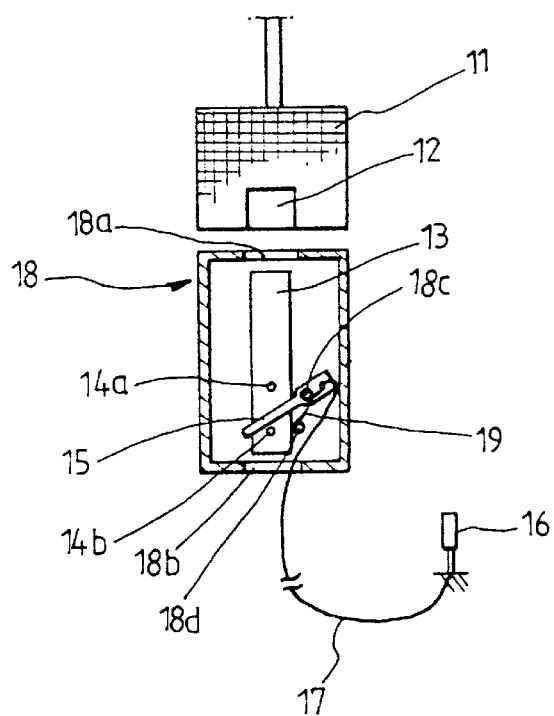
FIG. 4 is a cross-sectional view of a brake pedal locking apparatus of FIG. 3 in a locked condition.

FIG. 3 and FIG. 4 show a second embodiment of a brake pedal locking apparatus according to the present invention.

A latching groove 12 is formed at an upper surface of a brake pedal connected with a return spring (not shown). A latching member 13 for fixing the brake pedal 11 against the resiliently restoring force of the return spring is separatively inserted into and can move back and forth in the latching groove 12.

The brake pedal locking apparatus further includes a shifting means for shifting the latching member 13 to be inserted into the latching groove 12, a return means for drawing back the latching member 13 from the latching groove 12 with the restoring force, and a guide means for guiding the latching member 13.

The shifting means comprises two adjuster projections 14a and 14b located protrudingly at the upper surface of the latching member 13 with a predetermined space therebetween, a rotational lever 15, one end of which is located between the adjuster projections 14a and 14b and the other end of which is connected with a rotational shaft 15a to be rotated, an operational lever 16 installed near a driver, and a wire 17 for connecting the operational lever 16 and the rotational lever 15.

Accordingly, when a driver turns the operational lever 16, the wire 17 is pulled to rotate the rotational lever 15 clockwise. Then, the rotational lever 15 is engaged to the adjuster projections 14a to push the latching member 13 outward. As the result, the latching member 13 is inserted into the latching groove 12 of the brake pedal 11 to fix the brake pedal 11.

While the latching member 13 is moving by the shifting means, a guide means guides the latching member 13 toward the latching groove 12. The guide means includes a housing 18 of a vacant box-shape having a guide hole 18a at the front surface and a wire guide hole 18b at the rear surface, so the latching member 13 is received in the housing 18 and can be protruded toward the brake pedal out of the housing through the guide hole 18a.

Further, a pin 18c is formed integrally with the lower surface of the housing and the rotational lever 15 is mated with the pin rotatively.

Meanwhile, the return means includes a return spring 19, one end of which is wounded around the rotational shaft 15a of the rotational lever 15 and the other end of which is wounded around a projection 18d formed protrudingly on the lower surface of the housing 18.

Accordingly, when a driver turns the operational lever 16 in order to leave the driver's seat and maintain the braked condition, the wire 17 is pulled by the operational lever 16 to rotate the rotational lever 15 connected with the wire 17 clockwise. Then, the rotational lever 15 engages to the adjuster projections 14a to push the latching member 13, so that the latching member 13 received in the housing 18 protrudes from the guide hole 18a to be inserted into the latching groove 12 of the brake pedal 11.

As explained above, a driver may leave the driver seat while maintaining the brake pedal in the pushed position by simply turning a lever of the brake pedal locking apparatus of the present invention. Also, the brake pedal locking apparatus helps reduce fatigue of the driver due to repeated pedal pushing operation during a long traffic jam, since his leg can be free from the pedaling job. The driver also can do a leg exercise to relieve his fatigue. Further, the brake pedal locking apparatus could reinforce the braking force when parking to safely prevent an accident due to release of a parking brake system.

What is claimed is:

1. The combination of a brake pedal and an apparatus for locking a brake pedal into a pushed position comprising:

a latching groove formed at a surface of the brake pedal;

a hook device having a hook head for inserting into the latching groove to fix the brake pedal in the pushed position;

a housing having a cavity for receiving the hook device therein, and a penetrated hole for the hook device to protrude therethrough;

a first compression spring for pushing the hook device to protrude out of the penetrated hole for inserting into the latching groove when the brake pedal is in the pushed position; and an operational lever connected to the hook device by a wire for pulling the hook device into the housing and releasing the brake pedal from the pushed position.

2. The apparatus as claimed in claim 1 wherein said latching groove is funnel-shaped so that the hook head is prevented from being detached from the latching groove when the hook device is inserted into the latching groove.

3. The apparatus as claimed in claim 1 or claim 2 wherein said hook head includes two hook members connected rotatively on a hinge pin and a second compression spring installed between the hook members to provide the hook members with a spreading force.

4. The apparatus as claimed in claim 1 wherein said hook head is inserted into a hole formed on the front end of the hook device and mounted to the hook device by a pin.

5. The apparatus as claimed in claim 1 wherein said hook device includes two latching projections formed protrudingly and resiliently opposing each other at one end by the first compression spring placed in the latching projections.

6. The combination of a brake and an apparatus for locking a brake pedal into a pushed position comprising:

a latching groove formed on a surface of the brake pedal;

a movable latching member for fixing the brake pedal in the pushed position separatively inserted into the latching groove when the brake pedal is in the pushed position;

a shifting means for shifting the latching member to be inserted into the latching groove;

a return means for separating the latching member inserted into the latching groove from the latching groove; and a guide means for guiding the latching member.

7. The apparatus as claimed as claim 6 wherein said shifting means comprises two adjuster projections located protrudingly on a surface of the latching member with a predetermined space therebetween, a rotational lever one end of which is located between the adjuster projections and the other end of which is connected with a rotational shaft, an operational lever, and a wire for connecting the operational lever and the rotational lever so that moving the operational lever rotates the rotational lever.

8. The apparatus as claimed in claim 6 wherein said guide means comprises a housing of a vacant box shape having a latching member guide hole on the front surface and a wire guide hole on the rear surface.

9. The apparatus as claimed in claim 7 wherein a pin is formed integral with the lower surface of the housing and the rotational lever is coupled to the pin rotatively.

10. The apparatus as claimed in claim 7 wherein said return means comprises a return spring one end of which is coupled to the rotational shaft of the rotational lever and the other end of which is coupled to a projection formed protrudingly on the lower surface of the housing.

* * * * *